United States Patent
Chun et al.

(10) Patent No.: US 9,260,035 B2
(45) Date of Patent: Feb. 16, 2016

(54) ELECTRIC BICYCLE AND CONTROL METHOD THEREOF

(71) Applicant: MANDO CORPORATION, Pyeongtaek-si, Gyeonggi-do (KR)

(72) Inventors: Jae Hyung Chun, Yongin-si (KR); In Ha Paick, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 8 days.

(21) Appl. No.: 13/682,444

(22) Filed: Nov. 20, 2012

(65) Prior Publication Data
US 2014/0081494 A1 Mar. 20, 2014

(30) Foreign Application Priority Data

Sep. 19, 2012 (KR) ........................ 10-2012-0104229

(51) Int. Cl.
| | |
|---|---|
| *B60L 15/20* | (2006.01) |
| *B62M 6/45* | (2010.01) |
| *B62M 6/60* | (2010.01) |
| *B62J 6/12* | (2006.01) |
| *B62M 6/90* | (2010.01) |
| *B62K 15/00* | (2006.01) |

(52) U.S. Cl.
CPC .. *B60L 15/20* (2013.01); *B62J 6/12* (2013.01); *B62M 6/45* (2013.01); *B62M 6/60* (2013.01); *B62K 15/006* (2013.01); *B62M 6/90* (2013.01); *Y02T 10/7005* (2013.01); *Y02T 10/7275* (2013.01)

(58) Field of Classification Search
CPC ........................................................ B62M 6/45
USPC ........................ 701/22; 180/206.1, 206.2, 220
See application file for complete search history.

(56) References Cited

U.S. PATENT DOCUMENTS

| | | | | | |
|---|---|---|---|---|---|
| 3,884,317 | A | * | 5/1975 | Kinzel ................ | B60L 11/1801 180/206.1 |
| 5,226,501 | A | * | 7/1993 | Takata ................ | B60L 15/2063 180/19.1 |
| 5,664,636 | A | | 9/1997 | Ikuma et al. | |

(Continued)

FOREIGN PATENT DOCUMENTS

| | | |
|---|---|---|
| CN | 1060727 C | 1/2001 |
| DE | 19732430 A1 | 2/1999 |

(Continued)

OTHER PUBLICATIONS

Extended European Search Report issued in European Patent Application No. EP 12190275.3 dated Dec. 17, 2013.

(Continued)

*Primary Examiner* — Jonathan M Dager
(74) *Attorney, Agent, or Firm* — McDermott Will & Emery LLP (57) ABSTRACT

Disclosed herein are an electric bicycle and a control method thereof. The control method of the electric bicycle in which a motor is rotated using electric energy stored in a battery to drive the electric bicycle, includes receiving an acceleration instruction value to accelerate the electric bicycle, input by a driver, during traveling, calculating a reference value according to a traveling velocity of the electric bicycle, and increasing time taken for a rotating velocity of the motor to reach a target velocity, if the received acceleration instruction value is more than the calculated reference value.

15 Claims, 6 Drawing Sheets

(56) References Cited

U.S. PATENT DOCUMENTS

| | | | | |
|---|---|---|---|---|
| 5,777,442 | A * | 7/1998 | Miyata | B60L 11/1801 180/206.2 |
| 5,992,553 | A * | 11/1999 | Morrison | B62M 6/45 180/206.2 |
| 6,006,850 | A * | 12/1999 | Yu | B62M 6/45 180/220 |
| 6,545,437 | B1 * | 4/2003 | Strothmann | B62B 5/0026 180/206.2 |
| 6,866,111 | B2 * | 3/2005 | Dube | B62M 6/65 180/206.3 |
| 6,957,129 | B2 * | 10/2005 | Hatanaka et al. | 701/22 |
| 8,393,989 | B2 * | 3/2013 | Pohl | F16H 15/52 475/149 |
| 8,567,547 | B2 * | 10/2013 | Kulatunga | B60L 7/04 180/210 |
| 8,689,921 | B2 * | 4/2014 | Aoki | B62M 6/45 180/206.1 |
| 8,801,022 | B2 * | 8/2014 | Song | B62K 15/006 280/278 |
| 8,857,550 | B2 * | 10/2014 | Kim | B62K 3/10 180/206.2 |
| 8,997,910 | B2 * | 4/2015 | Kim | B62M 6/40 180/205.1 |
| 9,102,317 | B2 * | 8/2015 | Spelta | B60L 11/1801 |
| 9,108,700 | B2 * | 8/2015 | Chen | B62M 6/45 |
| 2004/0084238 | A1 * | 5/2004 | Yokotani | B62J 99/00 180/206.2 |
| 2009/0095552 | A1 * | 4/2009 | Gulas | B62M 6/45 180/206.5 |
| 2010/0131164 | A1 * | 5/2010 | Carter | B60L 11/1805 701/61 |
| 2011/0160945 | A1 * | 6/2011 | Gale | B60L 3/0023 701/22 |
| 2011/0266082 | A1 * | 11/2011 | Yang | B60L 11/007 180/206.5 |
| 2012/0061161 | A1 * | 3/2012 | Jang | B62M 6/60 180/220 |
| 2012/0202649 | A1 * | 8/2012 | Huber | A63B 69/16 482/2 |
| 2013/0093187 | A1 * | 4/2013 | Lim | H02K 13/00 290/50 |
| 2014/0046541 | A1 * | 2/2014 | Tsai | B62M 6/45 701/41 |
| 2014/0077740 | A1 * | 3/2014 | Son | B60L 11/007 318/454 |
| 2014/0080661 | A1 * | 3/2014 | Paick | B60W 10/08 477/3 |
| 2014/0081496 | A1 * | 3/2014 | Chun | B60L 11/00 701/22 |
| 2015/0060176 | A1 * | 3/2015 | Paick | B62M 6/60 180/208 |

FOREIGN PATENT DOCUMENTS

| | | |
|---|---|---|
| EP | 0 893 338 A1 | 1/1999 |
| JP | 2005-335534 A | 12/2005 |
| WO | 2011/081359 A2 | 7/2011 |

OTHER PUBLICATIONS

Chinese Office Action issued in corresponding Chinese Patent Application No. 201210552264.9, mailed on Jul. 13, 2015; with Korean language translation.

* cited by examiner

ELECTRIC BICYCLE AND CONTROL METHOD THEREOF

CROSS-REFERENCE TO RELATED APPLICATION

This application claims the benefit of Korean Patent Application No. 2012-0104229, filed on Sep. 19, 2012 in the Korean Intellectual Property Office, the disclosure of which is incorporated herein by reference.

BACKGROUND

1. Field

Embodiments of the present invention relate to an electric bicycle which prevents abrupt start during traveling, and a control method thereof.

2. Description of the Related Art

In general, an electric bicycle includes a motor rotating wheels, and a battery supplying power to the motor. The motor of the electric bicycle drives the wheels, causing the electric bicycle to travel.

In such an electric bicycle, when a driver turns a throttle serving as an acceleration unit located at a handle, the motor is driven to rotate the wheels, and thus the electric bicycle moves upwards.

When the throttle is operated for acceleration during traveling of the electric bicycle, abrupt start in that the electric bicycle is abruptly started at an excessively high velocity may occur.

Since such abrupt start of the electric bicycle during traveling may lower driver's ride comfort, safety measures to prevent abrupt start are required now.

SUMMARY

Therefore, it is an aspect of the present invention to provide an electric bicycle which may prevent abrupt start during traveling, and a control method thereof.

Additional aspects of the invention will be set forth in part in the description which follows and, in part, will be obvious from the description, or may be learned by practice of the invention.

In accordance with one aspect of the present invention, a control method of an electric bicycle in which a motor is rotated using electric energy stored in a battery to drive the electric bicycle, includes receiving an acceleration instruction value to accelerate the electric bicycle, input by a driver, during traveling, sensing a traveling velocity of the electric bicycle, calculating a reference value according to the sensed traveling velocity, comparing the received acceleration instruction value with the calculated reference value, and decreasing a velocity slope of the motor below a target velocity slope, if the received acceleration instruction value is more than the calculated reference value.

The control method may further include judging the received acceleration instruction value based on a throttle opening degree or pedal torque changed by the driver.

In the decrease of the velocity slope of the motor, the velocity slope of the motor may be decreased below the target velocity slope corresponding to the received acceleration instruction value, if the received acceleration instruction value is more than the calculated reference value.

The control method may further include sensing the traveling velocity of the electric bicycle, and decreasing the velocity slope of the motor far below the target velocity slope, as the sensed traveling velocity is lower.

The control method may further include sensing a gradient of a road surface on which the electric bicycle travels, judging whether or not the road surface is a flat, an ascent or a descent based on the sensed gradient of the road surface, changing the velocity slope of the motor to a first slope lower than the target velocity slope, upon judging that the road surface is the flat, changing the velocity slope of the motor to a second slope higher than the first slope, upon judging that the road surface is the ascent, and changing the velocity slope of the motor to a third slope lower than the first slope, upon judging that the road surface is the descent.

In accordance with another aspect of the present invention, a control method of an electric bicycle in which a motor is rotated using electric energy stored in a battery to drive the electric bicycle, includes receiving an acceleration instruction value to accelerate the electric bicycle, input by a driver, during traveling, calculating a reference value according to a traveling velocity of the electric bicycle, and increasing time taken for a rotating velocity of the motor to reach a target velocity, if the received acceleration instruction value is more than the calculated reference value.

The control method may further include judging the received acceleration instruction value based on a throttle opening degree or pedal torque changed by the driver.

In the increase of the time, the time taken for the rotating velocity of the motor to reach the target velocity corresponding to the received acceleration instruction value may be increased, if the received acceleration instruction value is more than the calculated reference value.

The control method may further include sensing the traveling velocity of the electric bicycle and further increasing the time taken for the rotating velocity of the motor to reach the target velocity, as the sensed traveling velocity is lower.

The control method may further include sensing a gradient of a road surface on which the electric bicycle travels, judging whether or not the road surface is a flat, an ascent or a descent based on the sensed gradient of the road surface, changing the time taken for the rotating velocity of the motor to reach the target velocity to a first time longer than the time corresponding to the acceleration instruction value, upon judging that the road surface is the flat, changing the time taken for the rotating velocity of the motor to reach the target velocity to a second time shorter than the first time, upon judging that the road surface is the ascent, and changing the time taken for the rotating velocity of the motor to reach the target velocity to a third time longer than the first time, upon judging that the road surface is the descent.

In accordance with another aspect of the present invention, an electric bicycle includes a power generator generating electric energy when pedals are rotated, a battery storing the electric energy generated from the power generator, a motor driven by the electric energy stored in the battery, a motor driving unit driving the motor, an input unit receiving an acceleration instruction value input by a driver, a velocity sensing unit sensing a traveling velocity of the electric bicycle, and an electronic control unit comparing the received acceleration instruction value input through the input unit with a reference value calculated according to the sensed traveling velocity during traveling, and controlling the motor driving unit to increase a time taken for a rotating velocity of the motor to reach a target velocity corresponding to the received acceleration instruction value, if the received acceleration instruction value is more than the calculated reference value.

The input unit may include a throttle opening degree sensing unit sensing an opening degree of a throttle provided at a handle or a pedal torque sensing unit sensing pedal torque applied to pedals by the driver.

The electronic control unit may include a reference value calculation unit calculating the reference value according to the sensed traveling velocity, a comparison unit comparing the received acceleration instruction value with the calculated reference value, an abrupt start judgment unit judging that the electric bicycle abruptly starts during traveling, if the received acceleration instruction value is more than the calculated reference value as a result of comparison of the comparison unit, and an abrupt start prevention unit outputting a motor control signal to increase the time taken for the rotating velocity of the motor to reach the target velocity corresponding to the received acceleration instruction value based on the received acceleration instruction value and the sensed traveling velocity, upon judging that the electric bicycle abruptly starts during traveling as a result of judgment of the abrupt start judgment unit.

The electronic control unit may control the motor driving unit so as to further increase the time taken for the rotating velocity of the motor to reach the target velocity, as the sensed traveling velocity is lower.

The electric bicycle may further include a gradient sensing unit sensing a gradient of a road surface on which the electric bicycle travels, and the electronic control unit may judge whether or not the road surface is a flat, an ascent or a descent based on the sensed gradient of the road surface, change the time taken for the rotating velocity of the motor to reach the target velocity to a first time longer than the time corresponding to the acceleration instruction value, upon judging that the road surface is the flat, change the time taken for the rotating velocity of the motor to reach the target velocity to a second time shorter than the first time, upon judging that the road surface is the ascent, and change the time taken for the rotating velocity of the motor to reach the target velocity to a third time longer than the first time, upon judging that the road surface is the descent.

In accordance with a further aspect of the present invention, an electric bicycle includes a power generator generating electric energy when pedals are rotated, a battery storing the electric energy generated from the power generator, a motor driven by the electric energy stored in the battery, a motor driving unit driving the motor, an input unit receiving an acceleration instruction value input by a driver, a velocity sensing unit sensing a traveling velocity of the electric bicycle, and an electronic control unit comparing the received acceleration instruction value input through the input unit with a reference value calculated according to the sensed traveling velocity during traveling, and controlling the motor driving unit to decrease a velocity slope of the motor below a target velocity slope corresponding to the received acceleration instruction value, if the received acceleration instruction value is more than the calculated reference value.

The electric bicycle may further include a gradient sensing unit sensing a gradient of a road surface on which the electric bicycle travels, and the electronic control unit may judge whether or not the road surface is a flat, an ascent or a descent based on the sensed gradient of the road surface, change the velocity slope of the motor to a first slope lower than the target velocity slope, upon judging that the road surface is the flat, change the velocity slope of the motor to a second slope higher than the first slope, upon judging that the road surface is the ascent, and change the velocity slope of the motor to a third slope lower than the first slope, upon judging that the road surface is the descent.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout. In the following description of the present invention, a detailed description of parts irrelevant to the description will be omitted when it may make the subject matter of the present invention rather unclear. Further, widths, lengths, thicknesses, etc. of elements may be exaggerated for convenience.

Figure 1:
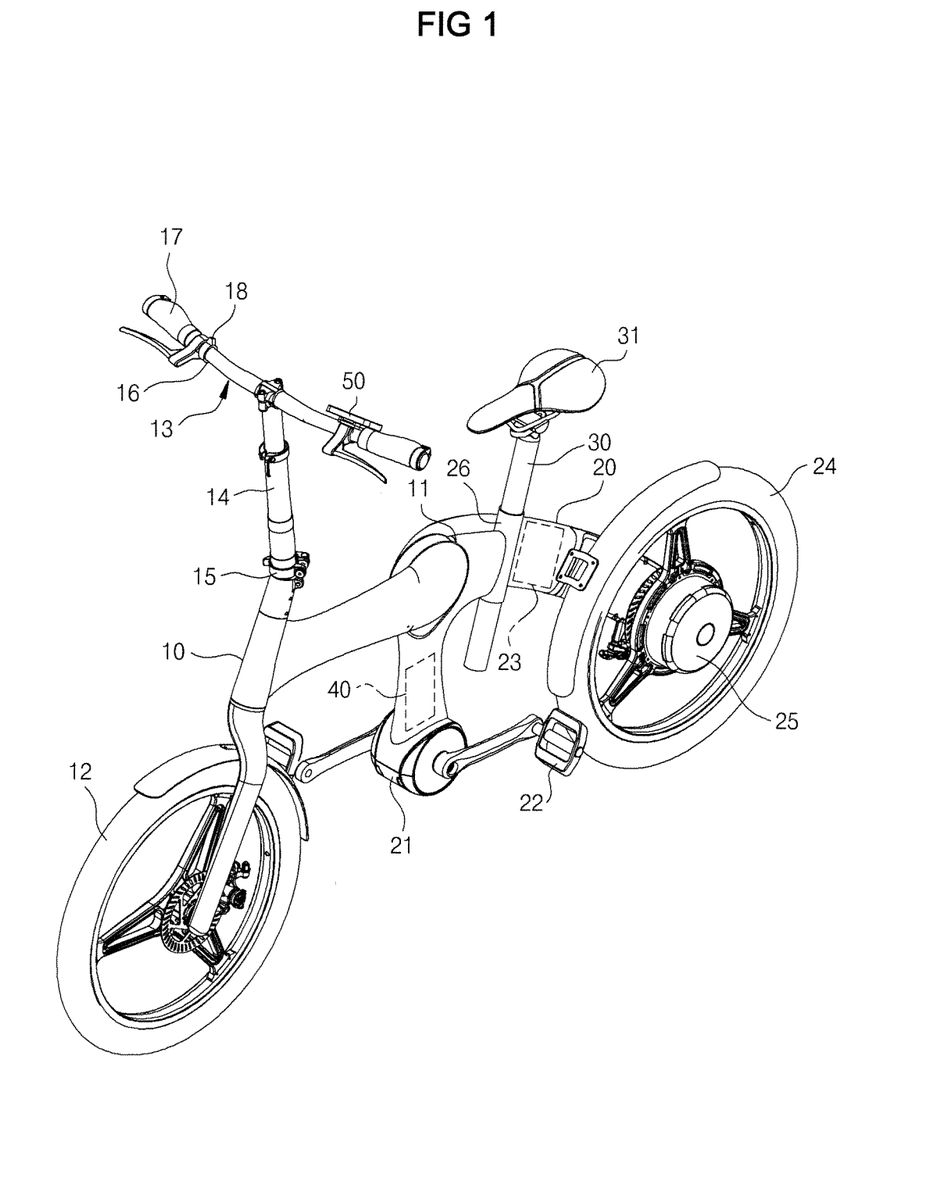
FIG. 1 is a perspective view of an electric bicycle in accordance with one embodiment of the present invention.

FIG. 1 is a perspective view of an electric bicycle in accordance with one embodiment of the present invention.

With reference to FIG. 1, the electric bicycle includes a front frame 10, a rear frame 20, and a saddle frame 30.

The front frame 10 and the rear frame 20 are connected to a hinge plate 11 axially connected to a hinge shaft and rotated forward and backward about the hinge shaft.

A handle stay 14 to which a front wheel 12 and a handle unit 13 are connected is connected to one end of the front frame 10.

The handle unit 13 includes a handle stem 15 connected to the lower end of the handle stay 14, a handle bar 16 connected to the handle stay 14, handle grips 17 installed at the handle bar 16, and a throttle 18 to receive acceleration instructions input by a user.

The handle stem 15 is provided to adjust the height of the handle unit 13. The handle bar 16 is provided to determine steering of the bicycle. An interface device 50 displaying the state of the electric bicycle to a driver and transmitting driver's requirements to an electronic control unit 40 which will be described later, through buttons is provided on the handle grip 17. Such an interface device 50 is electrically connected to the electronic control unit 40. The throttle 18 may be in the shape of a lever operable by the user, and outputs a signal representing a rotating degree of the throttle 18 according to rotation of the throttle 18 by the user. Such a throttle 18 may sense an opening degree of a throttle valve prepared therein and output a signal corresponding to the sensed opening degree of the throttle valve, in the same manner as general throttles.

The front wheel 12 is rotatably connected to one side of the lower end of the handle stay 14. In the embodiment of the present invention, the front wheel 12 may be connected to the right side of the lower end of the handle stay 14, as the electric bicycle is seen from the rear, the front wheel 12 may be connected to the handle stay 14 formed in a fork shape in the same manner as general bicycles.

A power generator 21 is provided at one end of the rear frame 20, and pedals 22 are rotatably mounted at both sides of the power generator 21. That is, when a driver rotates the pedals 22, the power generator 21 converts rotating force of the pedals 22 into electric energy, and the electric energy of the power generator 21 may be stored in a battery 23 which will be described later.

A rear wheel 24 is rotatably mounted at the left side of one end of the rear frame 20. Further, the rear wheel 24 may be mounted on the rear frame 40 formed in a fork shape in the same manner as general bicycles.

A motor 25 rotating the rear wheel 24 to cause the bicycle to move forwards is mounted on the rear wheel 24. The motor 25 may be provided with a transmission so as to change the rotating velocity of the rear wheel 24 by operation of the interface device 50 by the driver.

Further, the battery 23 storing electrical energy converted by the power generator 21 and the electronic control unit 40 may be installed in the rear frame 20. Here, the battery 23 may be installed in the front frame 10 as well as in the rear frame 20.

One side of the rear frame 20 is connected to the rear portion of a seat tube 26. The rear frame 20 and the seat tube 26 may be integrally formed.

The saddle frame 30 is provided on the rear frame 20. A saddle 31 on which the driver sits is mounted at one end of the saddle frame 30.

Figure 2:
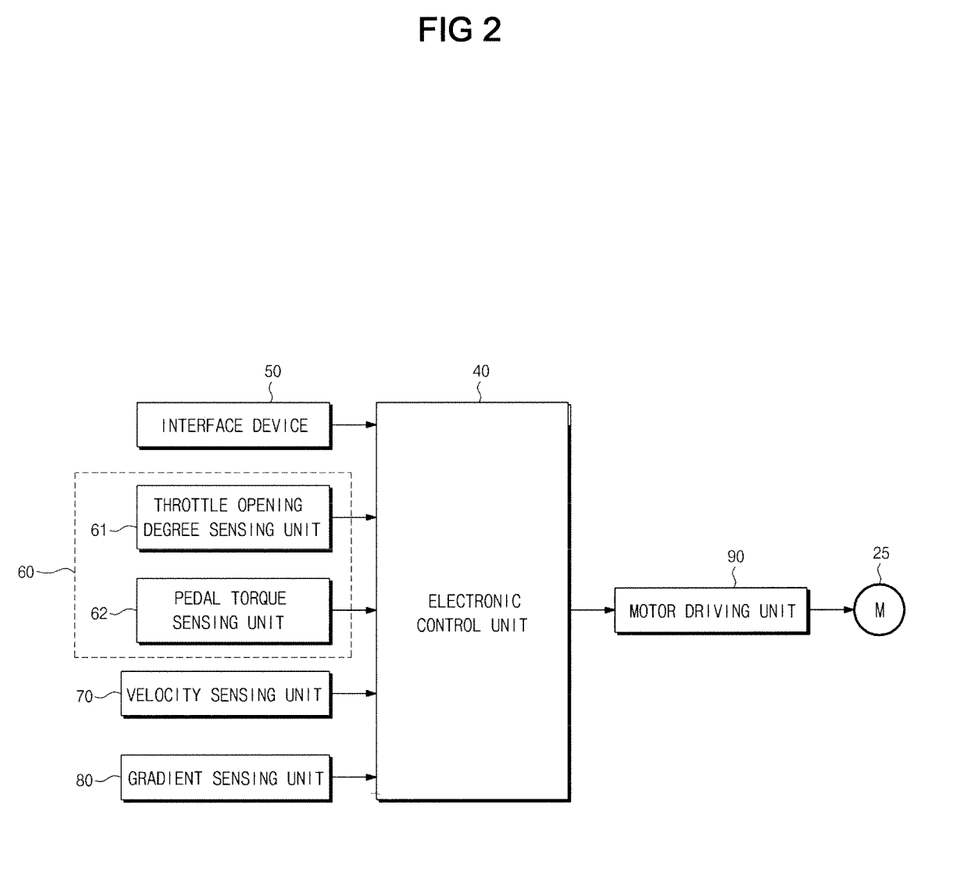
FIG. 2 is a control block diagram of the electric bicycle in accordance with the embodiment of the present invention.

FIG. 2 is a control block diagram of the electric bicycle in accordance with the embodiment of the present invention.

With reference to FIG. 2, the electric bicycle includes the electronic control unit 40, the interface device 50, an input unit 60, a velocity sensing unit 70, a gradient sensing unit 80 and a motor driving unit 90.

The interface device 50 displays the state of the electric bicycle to a driver and transmits driver's requirements to the electronic control unit 40 through buttons.

The input unit 60 serves to receive acceleration instructions input by the driver, and includes a throttle opening degree sensing unit 61 and a pedal torque sensing unit 62.

The throttle opening degree sensing unit 61 senses the opening degree of the throttle 18. That is, when the driver turns the throttle 18 to accelerate the electric bicycle, the throttle opening degree sensing unit 61 senses the opening degree of the throttle 18. Such a throttle opening degree corresponds to output of the motor.

The throttle opening degree sensing unit 61 may include a throttle position sensor provided within the throttle 18. The throttle position sensor is mounted on a throttle body, and converts the opening degree of a throttle valve into an electrical signal. The signal representing the throttle opening degree sensed by the throttle opening degree sensing unit 61 is transmitted to the electronic control unit 40.

The pedal torque sensing unit 62 may include a torque sensor provided on a pedal shaft of the rear frame 20. The torque sensor senses force applied by the driver to rotate the pedals, i.e., pedal torque. A signal representing the pedal torque sensed by the pedal torque sensing unit 62 is transmitted to the electronic control unit 40.

The velocity sensing unit 70 senses the velocity of the electric bicycle. For example, the velocity sensing unit 70 may be a wheel velocity sensor sensing the velocity of the front wheel 12.

The gradient sensing unit 80 senses the gradient of a road surface from the gradient of a vehicle. In order to sense the gradient of the road surface, various sensors which may sense the gradient of a vehicle, such as a gravity sensor (g-sensor) or a yaw rate sensor sensing the position state of a vehicle, may be used. For example, the g-sensor may be a 2-axis or 3-axis g-sensor. The 3-axis g-sensor may directly detect the gradient of a vehicle using a g-sensor value in the vertical direction and detect the gradient of a road surface using the detected gradient of the vehicle. The 2-axis g-sensor may directly calculate the gradient of a vehicle using a g-sensor value if the vehicle moves at a constant velocity, but may calculate the gradient of a vehicle using a value obtained by applying acceleration of the vehicle to a longitudinal g-sensor value if the vehicle moves at an accelerated velocity.

The motor driving unit 90 adjusts the rotating velocity of the motor 25. The motor driving unit 90 adjusts the rotating velocity of the motor 25 by changing the number of poles of the motor 25 or varying the frequency of power supplied to the motor 25.

The electronic control unit 40 receives an acceleration instruction value input by a driver according to the throttle opening degree sensed by the throttle opening degree sensing unit 61 or receives an acceleration instruction value input by the driver according to the pedal torque sensed by the pedal torque sensing unit 62, sets a reference value for judgment of abrupt start based on the traveling velocity of the electric bicycle, compares the received acceleration instruction value with the reference value, and increases a time taken for the rotating velocity of the motor 25 to reach a target velocity if abrupt start of the electric bicycle during traveling is expected. For example, by decreasing the velocity slope of the motor 25 below a velocity slope corresponding to the target velocity, the electric bicycle does not abruptly start during traveling, but start slowly starts.

The electronic control unit 40 increases the time taken for the rotating velocity of the motor 25 to reach the target velocity. Here, the time taken for the rotating velocity of the motor 25 to reach the target velocity may be increased or decreased according to the gradient of a road surface on which the electric bicycle travels.

Figure 3:
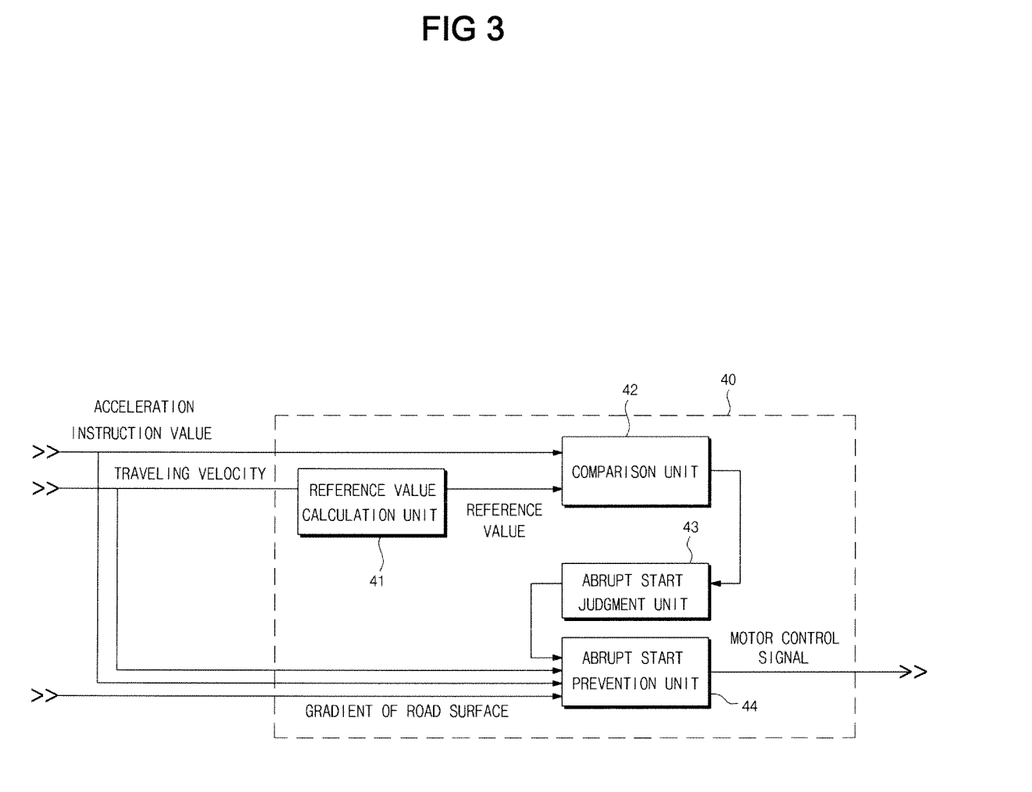
FIG. 3 is a view schematically illustrating an electronic control unit of the electric bicycle in accordance with the embodiment of the present invention.

FIG. 3 is a view schematically illustrating the electronic control unit of the electric bicycle in accordance with the embodiment of the present invention.

With reference to FIG. 3, the electronic control unit 40 includes a reference value calculation unit 41, a comparison unit 42, an abrupt start judgment unit 43, and an abrupt start prevention unit 44.

The reference value calculation unit 41 calculates the reference value for judgment of abrupt start during traveling according to the traveling velocity of the electric bicycle. The reference value calculation unit calculates a higher reference value as the traveling velocity is higher, and calculates a lower reference value as the traveling velocity is lower.

The comparison unit 42 compares the acceleration instruction value input by the driver with the reference value calculated by the reference value calculation unit 41, and transmits a result of comparison to the abrupt start judgment unit 43.

The abrupt start judgment unit 43 judges abrupt start or normal start according to the result of comparison transmitted from the comparison unit 42.

That is, the abrupt start judgment unit 43 judges that the electric bicycle abruptly starts during traveling, if the acceleration instruction value is more than the reference value as the result of comparison, and judges that the electric bicycle normally starts during traveling, if the acceleration instruction value is not more than the reference value.

The abrupt start prevention unit 44 adjusts the time taken for the motor 25 to reach the target velocity according to combination of the traveling velocity, the gradient of the road surface, etc., together with a result of judgment of the abrupt start judgment unit 43 and the acceleration instruction value input by the driver.

As a result of judgment of the abrupt start judgment unit 43, upon judging that the electric bicycle abruptly starts, the abrupt start prevention unit 44 outputs a motor control signal to increase the time taken for the motor 25 to reach the target velocity corresponding to the acceleration instruction value above a reference time (for example, a time corresponding to the acceleration instruction value). The velocity slope of the motor 25 is decreased below a target velocity slope by the motor control signal, thereby allowing the electric bicycle to slowly start without abrupt start.

The abrupt start prevention unit 44 may output differential motor control signals to increase the time taken for the motor 25 to reach the target velocity according to the traveling velocity.

That is, the abrupt start prevention unit 44 relatively greatly increases the time taken for the motor 25 to reach the target velocity as the traveling velocity is lower, and relatively slightly increases the time taken for the motor 25 to reach the target velocity as the traveling velocity is higher. Thereby, as the traveling velocity is lower, the motor velocity slope becomes relatively gentle to prevent abrupt start, and as the traveling velocity is higher, the motor velocity slope becomes relatively steep to increase the motor response velocity when instructions are applied again during traveling.

Further, the abrupt start prevention unit 44 may output differential motor control signals to increase the time taken for the motor 25 to reach the target velocity according to the gradient of a road surface.

That is, the abrupt start prevention unit 44 increases the time taken for the motor 25 to reach the target velocity, if the gradient of the road surface is a gradient corresponding to a descent, so as to be longer than the time taken for the motor 25 to reach the target velocity when the gradient of the road surface is a gradient corresponding to the flat, and increases the time taken for the motor 25 to reach the target velocity, if the gradient of the road surface is a gradient corresponding to an ascent, so as to be shorter than the time taken for the motor 25 to reach the target velocity when the gradient of the road surface is a gradient corresponding to the flat. Thereby, when the gradient of the road surface is a gradient corresponding to a descent, the motor velocity slope becomes relatively gentle to prevent abrupt start, and when the gradient of the road surface is a gradient corresponding to a ascent, the motor velocity slope becomes relatively steep to allow the electric bicycle to start on the ascent without being pushed.

As the result of judgment of the abrupt start judgment unit 43, upon judging that the electric bicycle normally starts, the abrupt start prevention unit 44 outputs a motor control signal to maintain the time taken for the motor 25 to reach the target velocity corresponding to the acceleration instruction value as a reference time.

Figure 4:
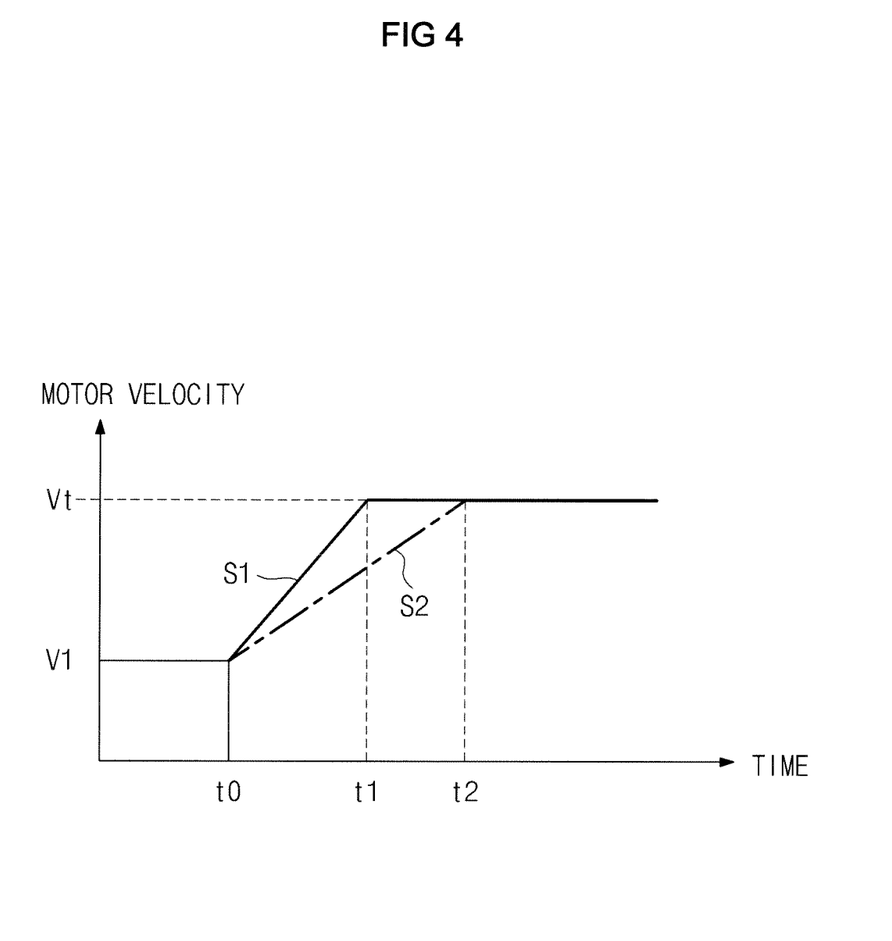
FIG. 4 is a graph representing change of a time taken for a rotating velocity of a motor to reach a target velocity so as to prevent abrupt start of the electric bicycle during traveling in the electric bicycle in accordance with the embodiment of the present invention.

FIG. 4 is a graph representing change of a time taken for a rotating velocity of the motor to reach a target velocity so as to prevent abrupt start of the electric bicycle during traveling in the electric bicycle in accordance with the embodiment of the present invention.

In the graph shown in FIG. 4, the horizontal axis represents time and the vertical represents motor velocity.

A motor velocity slope S1 represents a slope when the motor 25 reaches a target velocity Vt corresponding to an acceleration instruction value input by a driver within a reference time t1.

A motor velocity slope S2 represents a slope when the motor 25 reaches the target velocity Vt corresponding to the acceleration instruction value input by the driver within a time t2 set to be longer than the reference time t1.

When abrupt start of the electric bicycle during traveling at a random velocity V1 is expected, the motor velocity slope is changed from S1 to S2, thereby preventing abrupt start of the electric bicycle during traveling.

Figure 5:
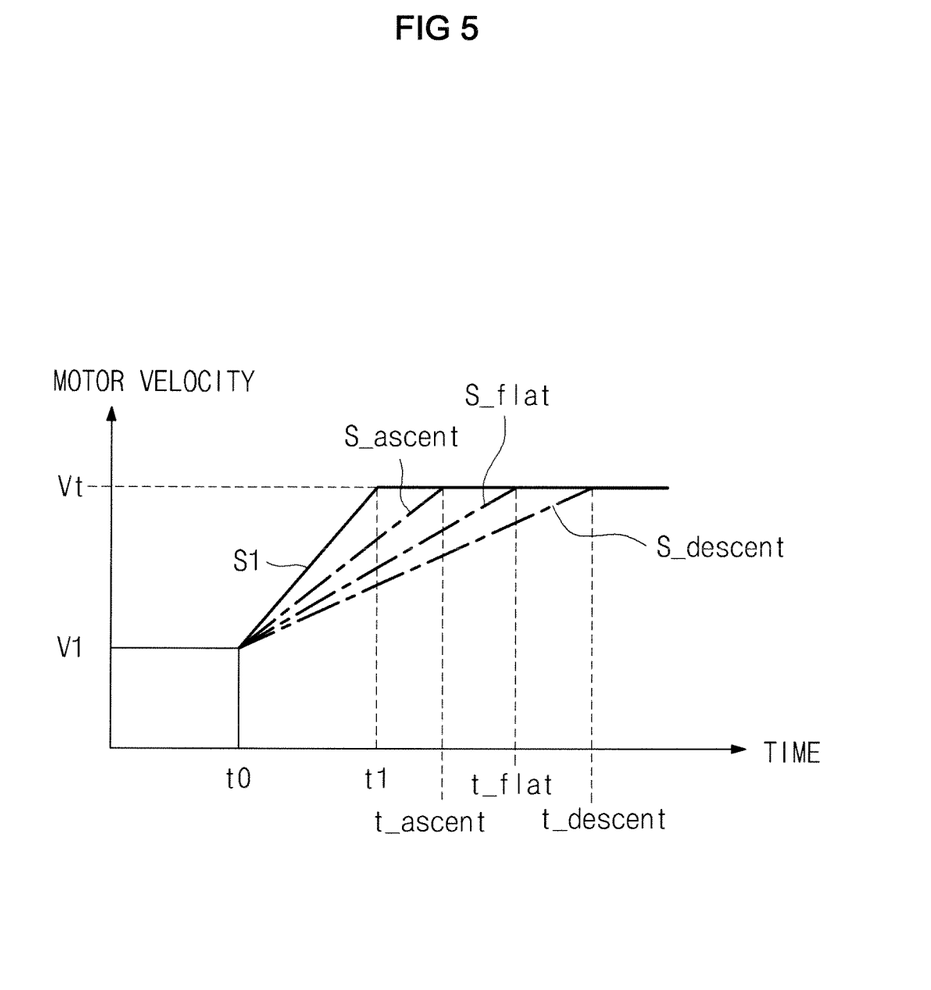
FIG. 5 is a graph representing variation of the increase rate of a time taken for the rotating velocity of the motor to reach the target velocity so as to prevent abrupt start of the electric bicycle during traveling, if a road surface on which the bicycle travels is a flat, a descent or an ascent, in the electric bicycle in accordance with the embodiment of the present invention.

FIG. 5 is a graph representing variation of the increase rate of the time taken for the rotating velocity of the motor to reach the target velocity so as to prevent abrupt start of the electric bicycle during traveling, if a road surface on which the bicycle travels is a flat, a descent or an ascent, in the electric bicycle in accordance with the embodiment of the present invention.

With reference to FIG. 5, when the electric bicycle abruptly starts during traveling, if the road surface on which the bicycle travels is a flat, the time taken for the rotating velocity of the motor 25 to reach the target velocity is changed from t1 to t_flat. Thereby, the motor velocity slope is changed from the target velocity slope S1 corresponding to the acceleration instruction value to a relatively gentle slope, i.e., S_flat.

Further, when the electric bicycle abruptly starts during traveling, if the road surface on which the bicycle travels is a descent, the time taken for the motor 25 to reach the target velocity is changed from t1 to t_descent. Thereby, the motor velocity slope is changed from the target velocity slope S1 corresponding to the acceleration instruction value to a relatively gentle slope, i.e., S_descent.

Further, when the electric bicycle abruptly starts during traveling, if the road surface on which the bicycle travels is an ascent, the time taken for the motor 25 to reach the target velocity is changed from t1 to t_ascent. Thereby, the motor velocity slope is changed from the target velocity slope S1 corresponding to the acceleration instruction value to a relatively gentle slope, i.e., S_ascent.

As shown in FIG. 5, the motor velocity slope S_descent changed if the road surface on which the bicycle travels is the descent is more gentle than the motor velocity slope S_flat changed if the road surface on which the bicycle is the flat, and the motor velocity slope S_ascent changed if the road surface on which the bicycle travels is the ascent is more steep than the motor velocity slope S_flat changed if the road surface on which the bicycle is the flat.

Figure 6:
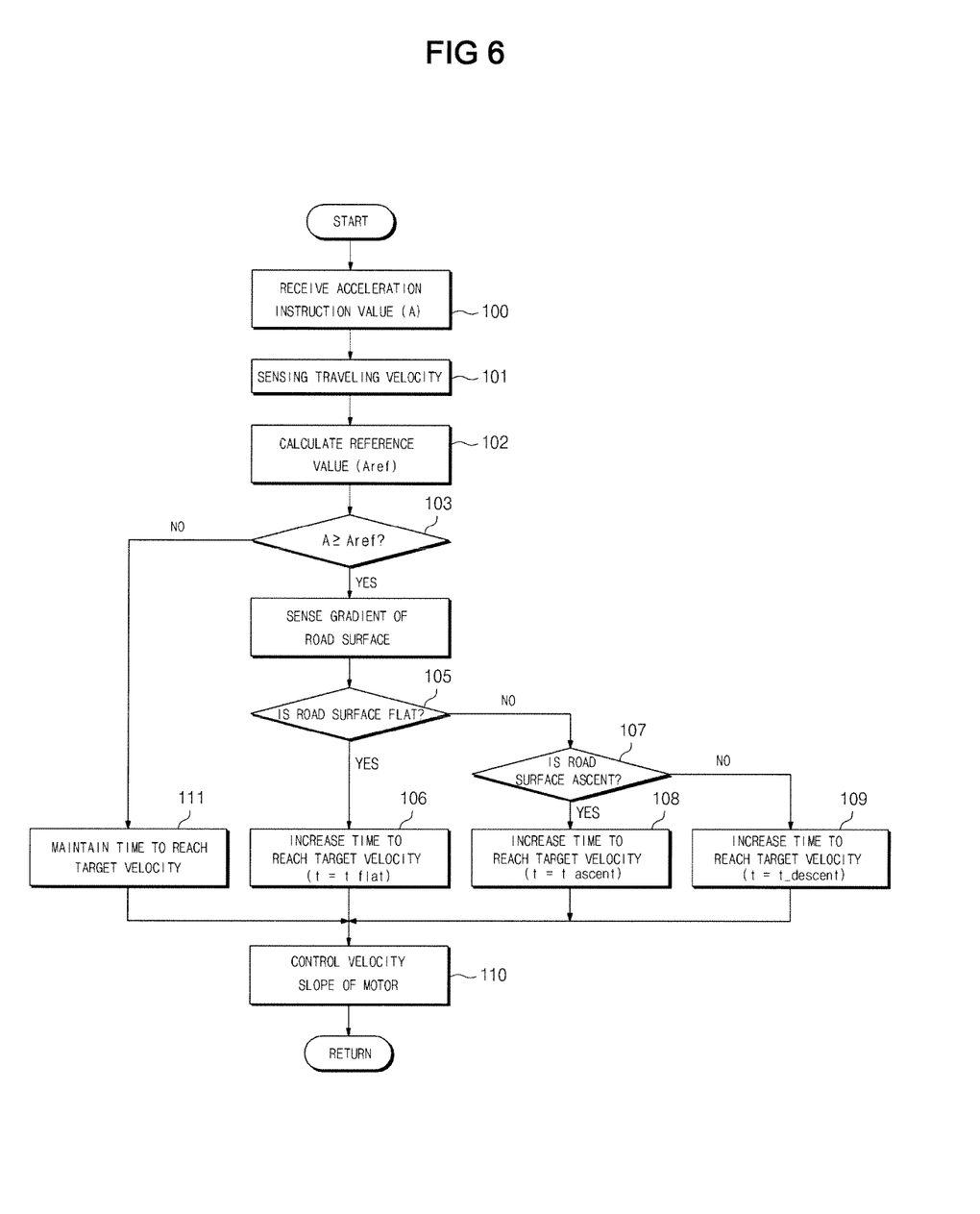
FIG. 6 is a flowchart illustrating a control method of an electric bicycle in accordance with one embodiment of the present invention to prevent abrupt start of the electric bicycle during traveling.

FIG. 6 is a flowchart illustrating a control method of an electric bicycle in accordance with one embodiment of the present invention to prevent abrupt start of the electric bicycle during traveling.

With reference to FIG. 6, first, the electronic control unit 40 receives an acceleration instruction value A input through the input unit 60 (Operation 100).

After receiving the acceleration instruction value A, the electronic control unit 40 senses the traveling velocity of the electric bicycle through the velocity sensing unit 70 (Operation 101).

After sensing the traveling velocity of the electric bicycle, the electronic control unit 40 calculates a reference value Aref to judge abrupt start of the electric bicycle during traveling according to the sensed traveling velocity (Operation 102). Here, the electronic control unit 40 calculates a higher reference value as the traveling velocity of the electric bicycle sensed through the reference value calculation unit 41 is higher, and calculates a lower reference value as the sensed traveling velocity of the electric bicycle is lower.

After calculating the reference value Aref, the electronic control unit 40 compares the received acceleration instruction value A with the calculated reference value Aref, and judges whether or not the acceleration instruction value A is more than the calculated reference value Aref (Operation 103).

As a result of judgment in Operation 103, upon judging that the received acceleration instruction value A is not more than the calculated reference value Aref, the electronic control unit 40 judges that the electric bicycle does not abruptly start but normally starts, and maintains time t1 taken for the rotating velocity of the motor 25 to reach a target velocity corresponding to the acceleration instruction value A (Operation 111). Then, the electronic control unit 40 controls the motor velocity slope such that the rotating velocity of the motor 25 reaches the target velocity corresponding to the acceleration instruction value A within the time t1 (Operation 110).

On the other hand, upon judging that the received acceleration instruction value A is more than the calculated reference value Aref, the electronic control unit 40 judges that the electric bicycle abruptly starts, and senses the gradient of a road surface on which the electric bicycle travels through the gradient sensing unit 80 (Operation 104).

After sensing the gradient of the road surface, the electronic control unit 40 judges whether or not the road surface on which the electric bicycle travels is a flat based on the sensed gradient of the road surface (Operation 105). If the gradient of the road surface is within a predetermined first range, it may be judged that the road surface on which the electric bicycle travels is the flat.

As a result of Operation 105, upon judging that the road surface on which the electric bicycle travels is the flat, the electronic control unit 40 increases the time taken for the rotating velocity of the motor 25 to reach the target velocity corresponding to the acceleration instruction value A from t1 to t_flat (Operation 106). Thereby, the motor velocity slope becomes gentle from S1 to S_flat and thus abrupt start of the electric bicycle is prevented (with reference to FIG. 5). Then, the electronic control unit 40 controls the motor velocity slope such that the rotating velocity of the motor 25 reaches the target velocity corresponding to the acceleration instruction value A within the time t_flat (Operation 110).

On the other hand, as the result of Operation 105, upon judging that the road surface on which the electric bicycle travels is not the flat, the electronic control unit 40 judges whether or not the road surface on which the electric bicycle travels is an ascent (Operation 107).

As a result of Operation 107, upon judging that the road surface on which the electric bicycle travels is the ascent, the electronic control unit 40 increases the time taken for the rotating velocity of the motor 25 to reach the target velocity corresponding to the acceleration instruction value A from t1 to t_ascent which is shorter than t_flat (Operation 108). Thereby, the motor velocity slope becomes gentle from S1 to S_ascent and thus abrupt start of the electric bicycle is prevented (with reference to FIG. 5). Then, the electronic control unit 40 controls the motor velocity slope such that the rotating velocity of the motor 25 reaches the target velocity corresponding to the acceleration instruction value A within the time t_ascent (Operation 110).

On the other hand, as the result of Operation 107, upon judging that the road surface on which the electric bicycle travels is not the ascent, the electronic control unit 40 judges that the road surface on which the electric bicycle travels is a descent and increases the time taken for the rotating velocity of the motor 25 to reach the target velocity corresponding to the acceleration instruction value A from t1 to t_descent which is longer than t_flat (Operation 109). Thereby, the motor velocity slope becomes gentle from S1 to S_descent and thus abrupt start of the electric bicycle is prevented (with reference to FIG. 5). Then, the electronic control unit 40 controls the motor velocity slope such that the rotating velocity of the motor 25 reaches the target velocity corresponding to the acceleration instruction value A within the time t_descent (Operation 110).

As is apparent from the above description, an electric bicycle in accordance with one embodiment of the present invention which changes a time taken for the rotating velocity of a motor to reach a target velocity, if a driver wants to excessively rapidly accelerate the electric bicycle during traveling, and thus prevents abrupt start, improves comfort ride of the driver and secures safety to abrupt start.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control method of an electric bicycle in which a motor is rotated using electric energy stored in a battery to drive the electric bicycle, comprising:
   receiving an acceleration instruction value, which is determined based on a throttle opening degree changed by a driver, to accelerate the electric bicycle during traveling;
   sensing a first current traveling velocity of the electric bicycle;
   calculating a reference value according to the sensed first current traveling velocity;
   comparing the received acceleration instruction value with the calculated reference value;
   sensing a gradient of a road surface on which the electric bicycle travels when it is determined that the received acceleration instruction value is more than the calculated reference value;
   decreasing a velocity slope of the motor below a target velocity slope based on the sensed gradient of the road surface;
   sensing a second current traveling velocity of the electric bicycle after decreasing the velocity slope of the motor; and
   decreasing further the velocity slope of the motor below the target velocity slope if the sensed second current traveling velocity is higher than a target velocity.

2. The control method according to claim 1, further comprising determining the received acceleration instruction value based on pedal torque changed by the driver.

3. The control method according to claim 1, wherein, in the decrease of the velocity slope of the motor, the velocity slope of the motor is decreased below the target velocity slope corresponding to the received acceleration instruction value, if the received acceleration instruction value is more than the calculated reference value.

4. The control method according to claim 1, further comprising, after sensing the gradient of the road surface:
   judging whether or not the road surface is a flat, an ascent, or a descent based on the sensed gradient of the road surface;
   changing the velocity slope of the motor to a first slope lower than the target velocity slope, upon judging that the road surface is the flat;

changing the velocity slope of the motor to a second slope higher than the first slope, upon judging that the road surface is the ascent; and changing the velocity slope of the motor to a third slope lower than the first slope, upon judging that the road surface is the descent.

5. A control method of an electric bicycle in which a motor is rotated using electric energy stored in a battery to drive the electric bicycle, comprising:

receiving an acceleration instruction value to accelerate the electric bicycle which is determined based on a throttle opening degree changed by a driver during traveling;

calculating a reference value according to a first current traveling velocity of the electric bicycle; and comparing the received acceleration instruction value with the calculated reference value;

sensing a gradient of a road surface on which the electric bicycle travels when it is determined that the received acceleration instruction value is more than the calculated reference value;

increasing a time taken for a rotating velocity of the motor to reach a target velocity based on the sensed gradient of the road surface;

sensing a second current traveling velocity of the electric bicycle after increasing the time taken for the rotating velocity of the motor; and increasing further the time taken for the rotating velocity of the motor to reach the target velocity if the sensed second current traveling velocity is higher than the target velocity.

6. The control method according to claim 5, further comprising determining the received acceleration instruction value based on pedal torque changed by the driver.

7. The control method according to claim 5, wherein, in the increase of the time, the time taken for the rotating velocity of the motor to reach the target velocity corresponding to the received acceleration instruction value is increased, if the received acceleration instruction value is more than the calculated reference value.

8. The control method according to claim 5, further comprising:

judging whether or not the road surface is a flat, an ascent, or a descent based on the sensed gradient of the road surface;

changing the time taken for the rotating velocity of the motor to reach the target velocity to a first time longer than the time corresponding to the acceleration instruction value, upon judging that the road surface is the flat;

changing the time taken for the rotating velocity of the motor to reach the target velocity to a second time shorter than the first time, upon judging that the road surface is the ascent; and changing the time taken for the rotating velocity of the motor to reach the target velocity to a third time longer than the first time, upon judging that the road surface is the descent.

9. An electric bicycle comprising:

a power generator generating electric energy when pedals are rotated;

a battery storing the electric energy generated from the power generator;

a motor driven by the electric energy stored in the battery;

a motor driving unit driving the motor;

an input unit receiving an acceleration instruction value input by a driver;

a velocity sensing unit sensing a traveling velocity of the electric bicycle;

an electronic control unit comparing the received acceleration instruction value input through the input unit with a reference value calculated according to the sensed traveling velocity during traveling, and controlling the motor driving unit to increase a time taken for a rotating velocity of the motor to reach a target velocity corresponding to the received acceleration instruction value, if the received acceleration instruction value is more than the calculated reference value; and a gradient sensing unit sensing a gradient of a road surface on which the electric bicycle travels when it is determined that the received acceleration instruction value is more than the calculated reference value, wherein the electronic control unit controls the motor driving unit to increase the time taken for the rotating velocity of the motor to reach the target velocity if the sensed traveling velocity is lower than the target velocity and to increase further the time taken for the rotating velocity of the motor to reach the target velocity based on the sensed gradient of the road surface.

10. The electric bicycle according to claim 9, wherein the input unit further includes a pedal torque sensing unit sensing pedal torque applied to pedals by the driver.

11. The electric bicycle according to claim 9, wherein the electronic control unit includes a reference value calculation unit calculating the reference value according to the sensed traveling velocity, a comparison unit comparing the received acceleration instruction value with the calculated reference value, an abrupt start judgment unit judging that the electric bicycle abruptly starts during traveling, if the received acceleration instruction value is more than the calculated reference value as a result of comparison of the comparison unit, and an abrupt start prevention unit outputting a motor control signal to increase the time taken for the rotating velocity of the motor to reach the target velocity corresponding to the received acceleration instruction value based on the received acceleration instruction value and the sensed traveling velocity, upon judging that the electric bicycle abruptly starts during traveling as a result of judgment of the abrupt start judgment unit.

12. The electric bicycle according to claim 9, wherein the electronic control unit judges whether or not the road surface is a flat, an ascent, or a descent based on the sensed gradient of the road surface, changes the time taken for the rotating velocity of the motor to reach the target velocity to a first time longer than the time corresponding to the acceleration instruction value, upon judging that the road surface is the flat, changes the time taken for the rotating velocity of the motor to reach the target velocity to a second time shorter than the first time, upon judging that the road surface is the ascent, and changes the time taken for the rotating velocity of the motor to reach the target velocity to a third time longer than the first time, upon judging that the road surface is the descent.

13. An electric bicycle comprising:

a power generator generating electric energy when pedals are rotated;

a battery storing the electric energy generated from the power generator;

a motor driven by the electric energy stored in the battery;

a motor driving unit driving the motor;

an input unit receiving an acceleration instruction value input by a driver;

a velocity sensing unit sensing a traveling velocity of the electric bicycle;

an electronic control unit comparing the received acceleration instruction value input through the input unit with a reference value calculated according to the sensed traveling velocity during traveling, and controlling the motor driving unit to decrease a velocity slope of the motor below a target velocity slope corresponding to the received acceleration instruction value, if the received acceleration instruction value is more than the calculated reference value; and a gradient sensing unit sensing a gradient of a road surface on which the electric bicycle travels when it is determined that the received acceleration instruction value is more than the calculated reference value, wherein the electronic control unit controls the motor driving unit to increase a time taken for a rotating velocity of the motor to reach a target velocity if the sensed traveling velocity is lower than the target velocity and to increase further the time taken for the rotating velocity of the motor to reach the target velocity based on the sensed gradient of the road surface.

14. The electric bicycle according to claim 13, wherein the electronic control unit judges whether or not the road surface is a flat, an ascent, or a descent based on the sensed gradient of the road surface, changes the velocity slope of the motor to a first slope lower than the target velocity slope, upon judging that the road surface is the flat, changes the velocity slope of the motor to a second slope higher than the first slope, upon judging that the road surface is the ascent, and changes the velocity slope of the motor to a third slope lower than the first slope, upon judging that the road surface is the descent.

15. The electric bicycle according to claim 13, wherein the input unit further includes a pedal torque sensing unit sensing pedal torque applied to pedals by the driver.

* * * * *